United States Patent
Satoh et al.

[11] Patent Number: 5,392,160
[45] Date of Patent: Feb. 21, 1995

[54] LENS BARREL HAVING A FLARE DIAPHRAGM MECHANISM

[75] Inventors: Kazuhiro Satoh, Sagamihara; Shigeo Hayashi, Okaya, both of Japan

[73] Assignee: Olympus Optical Co., Ltd., Tokyo, Japan

[21] Appl. No.: 1,798

[22] Filed: Jan. 8, 1993

[30] Foreign Application Priority Data

Jan. 8, 1992 [JP] Japan .................................. 4-001779

[51] Int. Cl.⁶ .......................................... G02B 13/02
[52] U.S. Cl. .................................... 359/695; 359/699
[58] Field of Search ............... 359/694, 695, 696, 697, 359/698, 699, 822, 823, 825, 826

[56] References Cited

U.S. PATENT DOCUMENTS

| | | | |
|---|---|---|---|
| 4,349,265 | 9/1982 | Kobayashi et al. | 359/825 |
| 4,681,406 | 8/1987 | Naito et al. | 359/699 |
| 5,037,187 | 8/1991 | Oda et al. | 359/699 |
| 5,225,939 | 7/1993 | Iizuka | 359/699 |

FOREIGN PATENT DOCUMENTS

| | | | |
|---|---|---|---|
| 56-80011 | 1/1981 | Japan . | |
| 58-42443 | 9/1983 | Japan . | |
| 60-4102 | 2/1985 | Japan . | |
| 60-41012 | 3/1985 | Japan . | |
| 0275404 | 11/1990 | Japan | 359/694 |

*Primary Examiner*—John T. Kwon
*Assistant Examiner*—Mark Sgantzos
*Attorney, Agent, or Firm*—Louis Weinstein

[57] ABSTRACT

A lens barrel according to the present invention includes a first frame member which is moved in the direction of the optical axis with respect to a fixed member due to a predetermined operation; a second frame member which is moved in the direction of the optical axis with respect to the fixed member and the first frame member due to a predetermined operation; and a flare diaphragm engaging to the second frame member and interposed between the first frame member and the fixed member, wherein the flare diaphragm is engaged by one of the fixed member and the first frame member as a result of the movement of the second frame member in the direction of the optical axis due to the predetermined operation, so that the flare diaphragm is moved in the direction of the optical axis with respect to the second frame member.

52 Claims, 5 Drawing Sheets

LENS BARREL HAVING A FLARE DIAPHRAGM MECHANISM

BACKGROUND OF THE INVENTION

1. Field of the Invention

The present invention relates to a lens barrel, and more particularly to a lens barrel having a flare diaphragm mechanism.

2. Related Art Statement

Hitherto, a variety of flare diaphragm mechanisms of a type which is moved in the direction of the optical axis in synchronization with zooming of a photographing zoom lens have been suggested.

For example, a technological means disclosed in Japanese Patent Publication No. 58-42443 is arranged in such a manner that a flare diaphragm disposed between a movable lens frame and a fixed member is moved in a direction of the optical axis by an adequate quantity by utilizing a relative movement taking place between the fixed frame and the movable lens frame and a cam means.

Another technological means disclosed in Japanese Patent Publication No. 60-4102 is structured to have a flare diaphragm drive cam which can be independently operated from each lens group arranged to be moved due to zooming of the photographing zoom lens, so that the flare diaphragm is operated by the drive cam.

A technological means disclosed in Japanese Patent Laid-Open No. 56-80011 is structured in such a way that a friction member, which is fastened to a movable frame, and the flare diaphragm are connected to each other by friction, and the flare diaphragm is fastened between another movable frame and a fixed frame so that the flare diaphragm is moved by utilizing the frictional force.

The aforesaid conventional technology, for example, the technological means disclosed in Japanese Patent Publication No. 58-42443 requires a space in which the movable lens frame is moved by the fixed member and also requires a cam for driving the flare diaphragm.

The technological means disclosed in Japanese Patent Laid-Open No. 60-4102 requires a cam for driving the flare diaphragm in such a manner that the cam is interlocked with the cam for driving the lens group.

In either case, the following problems are encountered as compared with a structure having no flare diaphragm:

(1) A large space is required.

(2) A complicated mechanism is required, causing a defect to take place in assembling and the cost cannot be reduced.

Although the technological means disclosed in Japanese Patent Laid-Open NO. 56-80011 is able to overcome the problems (1) and (2), other problems arise in that a frictional member is required to generate the frictional force and that the flare diaphragm is undesirably separated from the movable frame due to shock or the like.

OBJECTS AND SUMMARY OF THE INVENTION

A first object of the present invention is to provide a lens barrel having a flare diaphragm which can be driven without exclusive parts and which can be operated stably.

A second object of the present invention is to provide a lens barrel having a flare diaphragm which can be driven without a special drive cam and which can be operated stably.

A third object of the present invention is to provide a lens barrel having a flare diaphragm which can be driven without a special frictional member and which can be operated stably.

A fourth object of the present invention is to provide a lens barrel having a flare diaphragm which is not separated in the lens barrel even if the lens barrel is impacted.

A fifth object of the present invention is to provide a lens barrel, the length of which is not changed because a flare diaphragm is added thereto.

A lens barrel according to the present invention comprises:

a first frame member (cam cylinder 30) which is moved in the direction of the optical axis with respect to a fixed member (fixed cylinder 10) due to a predetermined operation;

a second frame member (float key 80) which is moved in the direction of the optical axis with respect to the fixed member and the first frame member due to a predetermined operation;

a flare diaphragm (100) fastened to the second frame member and interposed between the first frame member and the fixed member, wherein the flare diaphragm is connected to the fixed member or the first frame member as a result of the movement of the second frame member in the direction of the optical axis due to the predetermined operation, so that the flare diaphragm is moved in the direction of the optical axis with respect to the second frame member.

The above as well as other objects and advantages of the present invention will become further apparent from the following detailed explanation.

DETAILED DESCRIPTION OF THE PREFERRED EMBODIMENTS

Preferred embodiments of the present invention will now be described with reference to the drawings.

Figure 1:
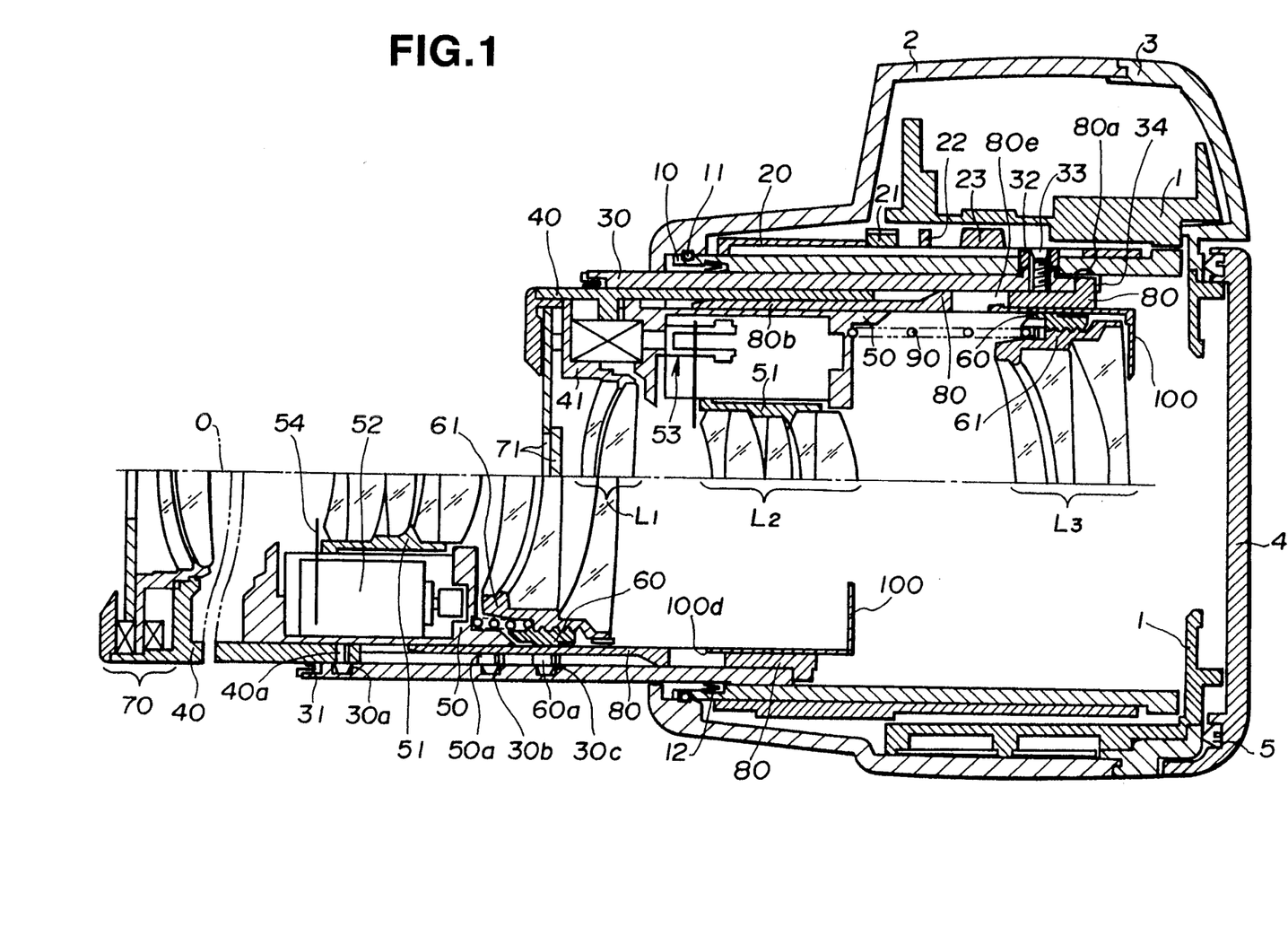
FIG. 1 is a cross sectional view which illustrates a lens barrel according to an embodiment of the present invention.
Figure 2:
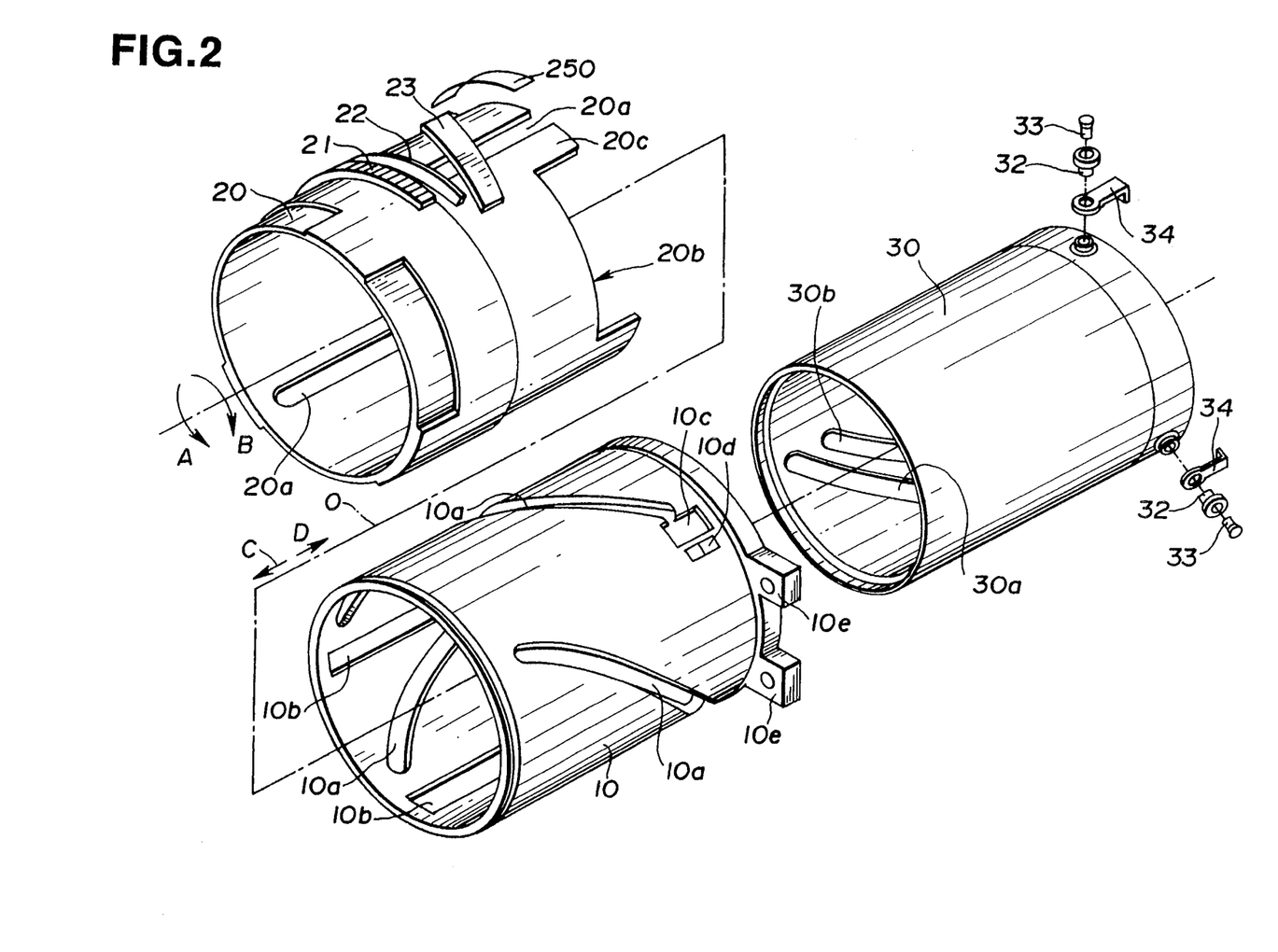
FIG. 2 is an exploded perspective view which illustrates elements of the aforesaid lens barrel and being elongated them in the direction of the optical axis.
Figure 3:
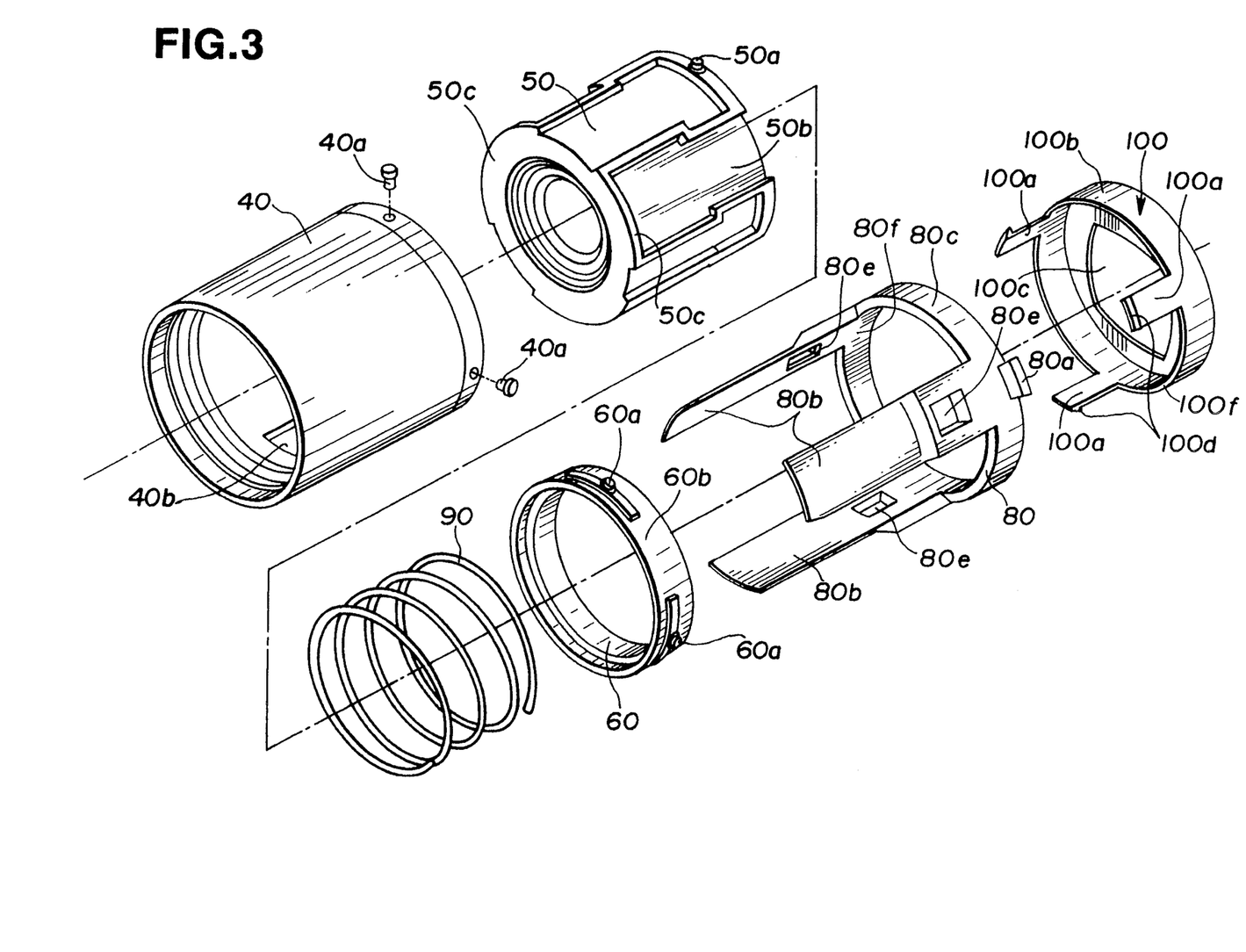
FIG. 3 is an exploded perspective view which illustrates elements of the aforesaid lens barrel and being elongated them in the direction of the optical axis.

FIG. 1 is a cross sectional view which illustrates an essential portion of a camera having a lens barrel according to an embodiment of the present invention. FIGS. 2 and 3 are exploded perspective views which illustrate the elements of the lens barrel according to this embodiment of the present invention, the elements being extended in the direction of the optical axis.

This embodiment is constituted by applying the present invention to a zoom lens barrel. The zoom lens barrel according to this embodiment comprises a fixed cylinder (also referred to as a first frame member) 10 integrally fastened to a camera body 1. The upper portion of FIG. 1 illustrates a wide state in which the zoom lens is moved to a wide angle position, while the lower portion illustrates a telescope state in which the zoom lens is moved to a telescope position.

The camera having the aforesaid lens barrel has the main portion constituted by a front cover 2 covering the front portion of the camera body 1, a rear cover 3 covering the rear portion of the same, and a back cover 4. The back cover 4 so fastened to the rear cover 3 by a hinge (omitted from illustration) as to be opened/closed can be closed by a light shielding elastic member 5 while being hermetically shielded from light.

The zoom lens barrel comprises a drive cylinder (also referred to as a first frame member 20 rotatably fitted to the outer surface of the fixed cylinder 10 and inhibited from the movement in the direction of the optical axis, a cam cylinder 30 fitted to the inner surface of the fixed cylinder 10, driven by the drive cylinder 20 and arranged to move forwards/rearwards in the direction of the optical axis while being rotated. The zoom lens barrel further comprises a first lens cylinder 40, a second lens cylinder 50 and a third lens cylinder 60 disposed sequentially in this order when viewed from the cam cylinder 30 and enabled to be moved forwards/rearwards in the direction of the optical axis, and a float key (also referred to as a second frame member, as well as a linear movement guide frame) 80 similarly disposed in the cam cylinder 30, inhibited by a key receiving member 34 from moving in the direction of the optical axis, inhibited by the fixed cylinder 10 from rotating around the optical axis, and arranged to restrict the rotation of the first lens cylinder 40, the second lens cylinder 50 and the third lens cylinder 60 around the optical axis. The zoom lens barrel further comprises a barrier unit 70 (see FIG. 1) disposed adjacent to the front surface of the first lens cylinder 40 and having a barrier 71 which is opened/closed by a barrier driver 53 (see FIG. 1) supported in the second lens cylinder 50. The zoom lens barrel further comprises a shutter blade 54 (see FIG. 1) which is opened/closed by a shutter unit 52 (see FIG. 1) supported in the second lens cylinder 50, and an elastic member 90 arranged between the second lens cylinder 50 and the third lens cylinder 60 and made of a coil spring for absorbing looseness of drive rollers 50a and 60a taking place with respect to cam grooves 30b and 30c to be described later. The zoom lens barrel further comprises a flare diaphragm 100 fastened to the rear portion of the float key 80.

The drive cylinder 20 has, on the outer surface thereof, a drive gear 21, a guide rib 22 and an interlocking cam 23 respectively formed into partial circular arcs and disposed in this sequential order from the forward position. The drive gear 21 receives drive force from a zooming drive unit (omitted from illustration) so as to rotate the drive cylinder 20 in counterclockwise direction (arrow A) or clockwise direction (arrow B) (see FIG. 2) around optical axis O while being guided by the guide rib 22. The interlocking cam 23 acts to zoom a lens of a finder optical system (omitted from illustration). The drive cylinder 20 has guiding elongated grooves 20a formed at trisectioned positions of the outer surface thereof, the guiding grooves 20a being formed in the direction of the optical axis. Moreover, the drive cylinder 20 comprises, at the rear end thereof, a cut portion 20b formed for allowing date-printing light beam emitted by a data unit (omitted from illustration) to pass through. Furthermore, an encoder 250 for detecting the quantity of rotation of the drive cylinder 20 is disposed at the rear end of the drive cylinder 20.

The fixed cylinder 10 has lead-shape cam grooves 10a for moving the cam cylinder 30 in the forward/rearward direction of the optical axis while rotating the cam cylinder 30, the lead-shape cam grooves 10a formed at trisectioned positions on the outer surface thereof. Furthermore, linear-movement guide grooves 10b which receive a guiding projection 80a of the float key 80 to be described later are formed at trisectioned positions when viewed in the circumferential direction, the linear-movement guide grooves 10b being formed in the inner surface of the fixed cylinder 10. Moreover, a rectangular through hole 10c elongated in the direction of the optical axis is, as shown in FIG. 2, formed in the rear end portion of the fixed cylinder 10 facing the surface of the film, the rectangular through hole 10c being formed adjacent to the end portion of a cam groove 10a among the aforesaid three cam grooves 10a which is positioned in the upper portion of the camera. At the time of the photographing operation, the cut portion 20b formed in the drive cylinder 20 superposes on and is aligned with the through hole 10c so as to pass passage therethrough the date printing light beam emitted from the data unit (omitted from illustration) which is a data printing means. Moreover, a stopper projection 10d projecting over the outer surface of the fixed cylinder 10 is formed at a position adjacent to the through hole 10c and opposing the end portion of the cam groove 10a, the stopper projection 10d being arranged to restrict the rotation of the drive cylinder 20. It should be noted that fastening arm portions 10e so formed at the rear end portion of the fixed cylinder 10 as to project into the radial direction are fastening portions with which the fixed cylinder 10 is fastened to the camera body 1.

Figure 6:
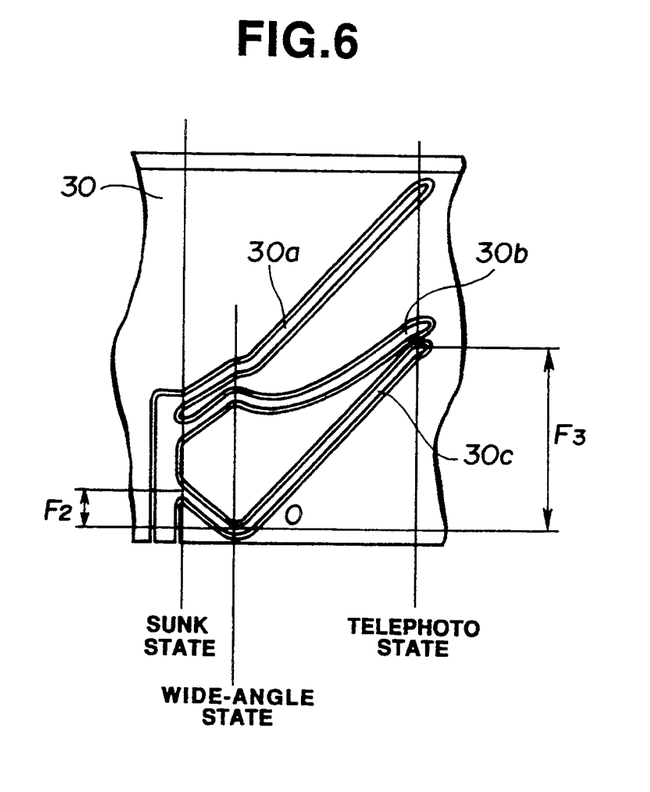
FIG. 6 is a plan view which illustrates cam grooves formed in the surface of a cam cylinder of the aforesaid lens barrel.

The cam cylinder 30 fitted within the fixed cylinder 10 has cam grooves 30a formed in the inner surface at trisectioned positions for the purpose of moving the first lens cylinder 40 in the direction of the optical axis in order to perform the zooming operation. Similarly, cam grooves 30b for moving the second lens cylinder 50 in the direction of the optical axis in order to perform the zooming operation, and cam grooves 30c for moving the third lens cylinder 60 in the direction of the optical axis in order to perform the zooming operation are respectively formed in the inner surface of the cam cylinder 30 at trisectioned positions. The states of each of the cam grooves 30a to 30c are illustrated in detail in FIG. 6. FIG. 6 illustrates a portion of the inner surface of the cam cylinder 30 in a planar manner.

Referring back to FIG. 2, zooming drive rollers 32 are respectively fixed by screws 33 at the trisections positions on the outer surface of the cam cylinder 30 at the rear end portion. The rollers 32 pass through the cam grooves 10a formed in the fixed cylinder 10 until they are received by the guiding elongated grooves 20a formed in the drive cylinder 20. As a result, when the drive cylinder 20 is rotated around optical axis O, also the zooming drive roller 32 is rotated by the guiding elongated groove 20a, causing the cam cylinder to be moved forwards/rearwards by the cam groove 10a while being rotated.

The first lens cylinder 40 includes a lens supporting frame 41 which holds a first lens group L1 (see FIG. 1) and which is fixed at a position in a relatively front portion thereof. Moreover, the first lens cylinder 40 has relatively wide guide grooves 40b formed in the inner surface thereof at trisectioned positions in the direction of the optical axis. The guide grooves 40b receive the outer surface of a key portion 80b of a float key 80 to be described later so as to restrict the lens cylinder 40 to move only in the direction of the optical axis. Moreover, drive rollers 40a are fixedly implanted in the outer surface of the rear end portion of the lens cylinder 40 at trisectioned positions, the drive rollers 40a being received by the cam grooves 30a formed in the cam cylinder 30.

A lens supporting frame 51, which holds a second lens group L2 (see FIG. 1), is secured to the inner surface of the second lens cylinder 50. Furthermore, relatively wide guiding cut portions 50b are formed in the circumferential direction of the outer surface of the second lens cylinder 50 at trisectioned positions. The guiding cut portions 50b are arranged to receive the inner surface of the key portion 80b of the float key 80 to be received by the guide groove 40b, so that the movement of the lens cylinder 50 is restricted to move only in the direction of the optical axis. As a result, the key portion 80b of the float key 80 is held between the guide groove 40b and the guiding cut portion 50b. Moreover, drive rollers 50a are implanted in the rear portions of the outer surface of the second lens cylinder 50 between the guiding cut portions 50b. As a result, the drive rollers 50a are implanted in the rear portion of the outer surface of the lens cylinder 50 at trisectioned positions so as to be respectively received by the cam grooves 30b formed in the cam cylinder 30.

As described above, the second lens cylinder 50 has the shutter unit 52 and the shutter blade 54 which are integrally moved forwards/rearwards together with the second lens cylinder 50.

The third lens cylinder 60 includes a lens supporting frame 61 which is secured to the inner surface thereof and which holds a third lens group L3 (see FIG. 1). Furthermore, relatively wide guiding cut portions 60b are formed in the circumferential direction of the outer surface of the third lens cylinder 60 at trisectioned positions. The guiding cut portions 60b are arranged to receive the key portion 80b of the float key 80 disposed between the guide groove 40b and the guiding cut portion 50b, so that the movement of the lens cylinder 60 is restricted to move only in the direction of the optical axis. In addition, drive rollers 60a are implanted between the guiding cut portions 60b formed in the outer surface of the lens cylinder 60. Therefore, the drive rollers 60a are respectively implanted at trisectioned positions in the outer surface of the lens cylinder 60, so that each drive roller 60a is received by cam associate cam groove 30c formed in the cam cylinder 30.

Furthermore, an elastic member 90 made of a coil spring is arranged between the front surface of the third lens cylinder 60 and the rear surface of the second lens cylinder 50, the elastic member 90 acting to absorb looseness of the drive roller 50a received by the cam groove hole 30b and that of the drive roller 60a received by the cam groove hole 30c.

The float key 80 comprises an annular base portion 80c, the front portion of which is positioned on the inner surface of the rear end portion of the cam cylinder 30, the three key portions 80b extending forwards from the trisectioned positions of the front surface of the annular base portion 80c, rectangular fitting holes 80e formed adjacent to the annular base portions 80c of the key portions 80b and elongated in the direction of the optical axis, and guiding projections 80a projecting over the outer surface of the annular base portion 80c at trisectioned positions so as to be received by the linear-movement guide grooves 10b formed in the fixed cylinder 10. The float key 80 is able to be moved in the direction of the optical axis together with the cam cylinder 30 but its rotation around the optical axis O is inhibited because of an arrangement so made that the rear end surface of its annular base portion 80c is simultaneously received by a key receiving portion 34 fixed by the screws 33 when the zooming drive rollers 32 are fixed at the trisectioned positions of the outer surface of the rear end portion of the cam cylinder 30. The three key portions 80b extending forward pass through the guiding portions 60b of the third lens cylinder 60, the guiding cut portions 50b of the second lens cylinder 50 and the guide grooves 40b of the first lens cylinder The flare diaphragm 100 (see FIG. 3) comprises an annular wall portion 100b formed around a thin plate ,which has a flare diaphragm opening 100c formed at the central portion thereof, the annular wall portion 100b being formed to extend forward and parallel to the optical axis (chain line of FIG. 3. The flare diaphragm 100 further comprises fitting members 100a extending forwards from the trisectioned positions of the front surface of the annular wall portion 100b, the fitting members 100a having elasticity. The flare diaphragm 100 further comprises fastening claws 100d formed on the outer surfaces of the leading portions of the fitting members 100a. The flare diaphragm 100 is fitted from the rear portion of the float key 80 along its inner surface while preventing an interference with the third lens cylinder 60 so as to cause the fastening claws 100d of the fitting members 100a to be elastically received by the rectangular fitting holes 80e formed in the float key 80. As a result, the flare diaphragm 100 is so fastened to the rear portion of the float key 80 as to be moved in the direction of the optical axis by a distance equal to the axial length of the fitting hole 80e.

As shown in FIG. 1, an "O" ring 11 is disposed between the inner surface of the leading portion of the front cover 2 and the outer surface of the leading portion of the fixed cylinder 10 for the purpose of shielding light and liquid. Similarly, elastic rings 12 and 31 are respectively disposed between the inner surface of the relatively front portion of the fixed cylinder 30 and the outer surface of the cam cylinder 10 and between the front surface of the cam cylinder 30 and the outer surface of the first lens cylinder 40 for the purpose of shielding light and liquid.

Then, the operation of the thus structured zoom lens barrel and that of the flare diaphragm 100 will now be described with reference to FIGS. 2 to 5. FIG. 5 is a graph which shows the movement of each lens group in the zoom lens barrel from the collapsed state to the telescope state (hereinafter called "state T").

First, a zoom motor unit output gear (omitted from illustration) is allowed to engage with the drive gear 21, so that the drive cylinder 20 is rotated in direction A or B (see FIG. 2). Assuming that the drive cylinder 20 is rotated from the collapsed state in the direction A, the cam cylinder 30 is moved in the direction C of optical axis O (see FIG. 2) while being rotated in the direction A due to the relationship between the guiding elongated groove hole 20a and the cam groove hole 10a. The float key 80, which can be rotated with respect to the cam cylinder 30 and which is integrally fastened to the same in the direction of the optical axis at this time, is linearly moved in the direction C of the optical axis O in such a manner that it is not rotated due to the relationship between the linear-movement guide groove 10b and the guiding projections 80a. Furthermore, the first lens cylinder 40, the second lens cylinder 50 and the third lens cylinder 60 are not rotated but are moved linearly because the first lens cylinder 40, the second lens cylinder 50 and the third lens cylinder 60 are so structured as not to be rotated with respect to the float key 80 as described above.

As described above, the cam groove formed in the cam cylinder 30 is composed of the cam grooves 30a for the first lens group, the cam grooves 30b for the second lens group and the cam grooves 30c for the third lens group. The maximum movement quantities LL1, LL2 and LL3 of the lens groups synthesized by the cam grooves 30a, 30b and 30c and the cam groove holes 10a respectively are as shown in FIG. 5. The maximum movement quantities LL1, LL2 and LL3 respectively are the maximum movement quantities of the first lens group L1, the second lens group L2 and the third lens group L3. Referring to FIG. 5, symbols L1, L2a, L2b and L3 respectively represent the loci of movements of the lens groups, where L1 represents the locus of the first lens group, L2a and L2b represent the loci of the second lens group at the time of thee nearest state and the infinite state, and L3 represent the locus of the third lens group. Referring to FIG. 5, symbol 1b represents the surface of the film and LLM represents the shortest length from the lens supporting frame 41 to the drive roller 60a.

While standardizing the float key 80, the cam cylinder 30 is only rotated, causing each lens group to be converted from the collapsed state to the state T as shown in FIG. 5.

If the output gear of the zoom motor unit is rotated reversely, the drive cylinder 20 is rotated in the direction B (see FIG. 2), resulting in each of the lens groups being moved from the state T to the collapsed state as shown in FIG. 5.

It should be noted that the cut portion 20b formed in the drive cylinder 20 is allowed to engage with the stopper projection 10d formed on the fixed cylinder 10, so that the rotation of the drive cylinder 20 is restricted if the drive cylinder 20 is excessively collapsed and if the same is excessively converted from the state T toward the telephoto state.

Figure 4A:
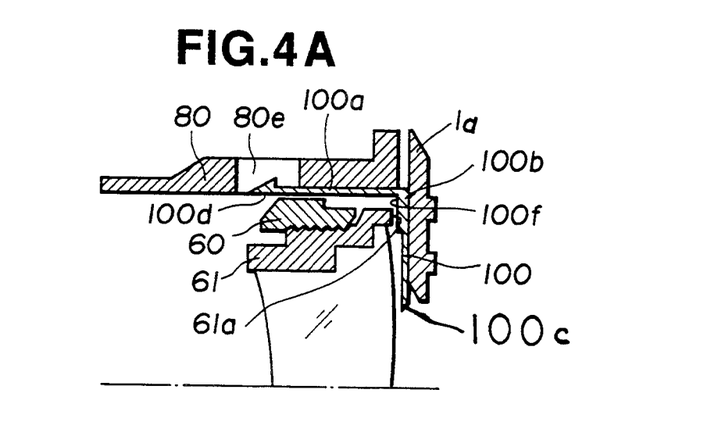
FIG. 4A is an enlarged cross sectional view which illustrates a state of a portion around a flare diaphragm portion of the aforesaid lens barrel in a state where each lens group is in a collapsed state.
Figure 4B:
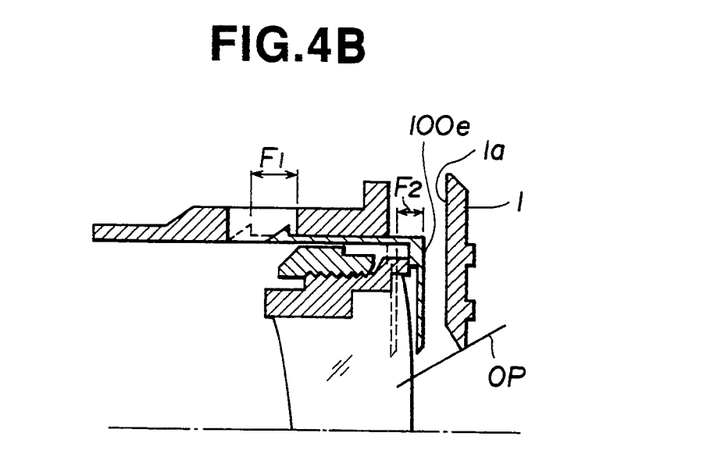
FIG. 4B is an enlarged cross sectional view which illustrates a state of a portion around a flare diaphragm portion of the aforesaid lens barrel in a state where each lens group has performed the zooming operation to the wide angle state.
Figure 4C:
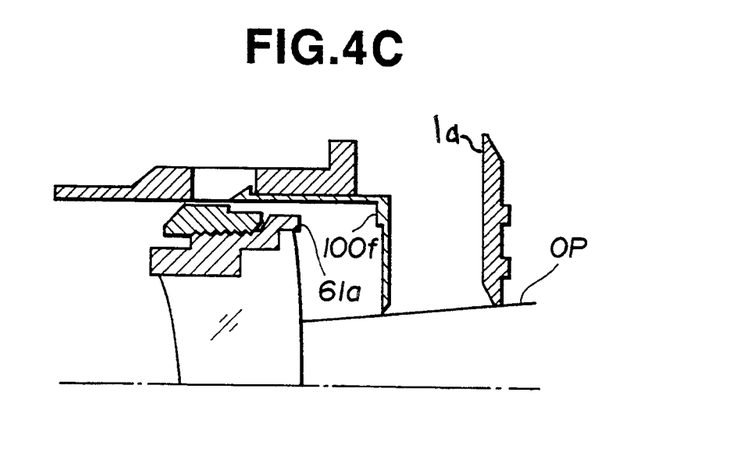
FIG. 4C is an enlarged cross sectional view which illustrates a state of a portion around a flare diaphragm portion of the aforesaid lens barrel in a state where each lens group has performed the zooming operation to the telescope state.
Figure 5:
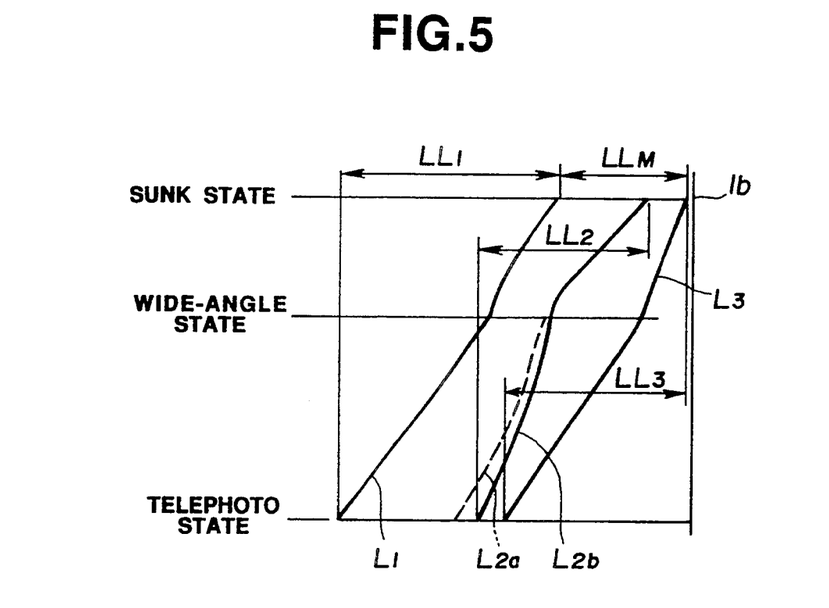
FIG. 5 is a graph which illustrates a state of movement of each lens group of the aforesaid lens barrel.

With reference to FIGS. 4A to 4C, the operation of the flare diaphragm 100 to be performed at the time of the zooming operation will now be described.

FIG. 4A illustrates a state of the flare diaphragm when each lens group is in the collapsed state. In the collapsed state, the flare diaphragm 100 is positioned in contact with a mask front surface 1a of the camera. At this time, a small gap is formed between a front surface 100f of the flare diaphragm 100 and a rear surface 61a of the lens supporting frame 61. Furthermore, the fastening claw 100d of the flare diaphragm 100 is positioned in a relatively front portion of the fitting hole 80e of the float key 80 at this time.

Then, the state of the flare diaphragm 100 when each lens group is zoomed to the state W will now be described with reference to FIG. 4B. In this state, the cam cylinder 30 is moved in the direction of the optical axis while being guided by the cam groove 10a formed in the fixed cylinder (i.e. fixed or first member) 10. Also the float key 80 is moved in the direction of the optical axis by the same quantity due to the aforesaid movement of the cam cylinder 30. At this time, the third lens cylinder 60 has been returned by a distance F2 with respect to the cam cylinder 30 and the float key 80 in the direction of the optical axis. As a result of the aforesaid movement, the rear end surface 61a of the lens supporting frame 61 comes in contact with the front surface 100f of the flare diaphragm 100, causing the flare diaphragm 100 to be pushed rearwards in the direction of the optical axis and moved relative to float key 80.

When each lens group is converted into the state T as shown in FIG. 4C due to the zooming operation, the cam cylinder 30 and the float key 80 are moved in the direction of the optical axis while being guided by the cam groove hole 10a formed in the fixed cylinder 10. At this time, the third lens cylinder 60 has been moved in the direction of the optical axis by a distance F3 (see FIG. 6). However, the positional relationship between the float key 80 and the flare diaphragm 100 is not changed from the state W because the movement of the third lens cylinder 60 does not physically affect the flare diaphragm 100 at the aforesaid state. At this time, the flare diaphragm opening 100c is positioned at a position between the third lens group and the mask front surface 1a so as not to affect effective light beam OP in the state T.

During the conversion of each lens group from the state W to the State T due to the zooming operation, the state is simply converted from that shown in FIG. 4C to that shown in FIG. 4B, and therefore its description is omitted here.

During the conversion of each lens group from the state W to the collapsed state, the third lens cylinder 60 is moved forwards by distance F2 (see FIG. 6) with respect to the float key 80. However, the aforesaid operation does not cause the movement of the flare diaphragm 100 with respect to the float key 80. However, the movements of the cam cylinder 30 and the float key 80 with respect to the fixed cylinder 10 in direction D (see FIG. 2) along the optical axis O causes the flare diaphragm 100 to be as well as moved rearwards by the same quantity. At this time, the overall length of the lens can be minimized by maximizing the quantity of the collapse. In order to maximize the quantity of the collapse, the float key must be collapsed to substantially come in contact with the camera body 1.

Therefore, the flare diaphragm 100 projecting over the rear end surface of the float key 80 is pushed toward the mask front surface 1a with respect to the float key 80 as shown in FIG. 4B. The structure is arranged in such a manner that the aforesaid movement does not cause the flare diaphragm opening 100c to come in contact with the third lens group.

As a result, the flare diaphragm thus constituted is moved in the direction of the optical axis with respect to the third lens group during the conversion taken as follows: collapsed state→ state W→ state T (→state W→ collapsed state). Therefore, the flare diaphragm is positioned at corresponding adequate positions, so that the effect of the flare diaphragm can be obtained.

Furthermore, the engagement of the fastening claw 100d of the flare diaphragm 100 with the inner wall 80f of the float key 80 enables a stable operation to be performed even if the fastening member 100a of the flare diaphragm 100 is abutted elastically against the key portion 80b of the float key 80.

Moreover, the fact that the fastening claw 100d of the flare diaphragm 100 is received by the fitting hole 80e formed in the float key 80 is able to prevent separation of the flare diaphragm 100 from the float key 80 even if the lens barrel receives impact or the like.

In this invention, it is apparent that working modes different in a wide range can be formed on this basis of this invention without departing from the spirit and scope of the invention. This invention is not restricted by any specific embodiment expect as may be limited by the appended claims.

What is claimed is:

1. A lens barrel comprising:
a first frame member movable in a direction of an optical axis with respect to a fixed member;
a second frame member movable in a direction of the optical axis with respect to said fixed member and said first frame member;
a flare diaphragm engaging said second frame member and interposed between said first frame member and said fixed member, wherein
said flare diaphragm is selectively engaged by one of said fixed member and said first frame member as a result of the movement of said second frame member in a direction of the optical axis due to said predetermined operation, so that said flare diaphragm is moved in a direction of the optical axis with respect to said second frame member.

2. A lens barrel according to claim 1, wherein engagement between said flare diaphragm and said second frame member is a frictional engagement between opposing surfaces of said flare diaphragm and said second frame member.

3. A lens barrel according to claim 1, wherein said flare diaphragm is movable by said second frame member due to a frictional engagement between an outer surface of said flare diaphragm and an inner surface of the second frame member.

4. A lens barrel according to claim 1, wherein means are provided to limit the amount of relative movement of said flare diaphragm with respect to said second frame member along said optical axis.

5. A lens barrel according to claim 1, wherein an optical directional end surface of said flare diaphragm selectively engages one of an optical directional end surface of said first frame member and an optical directional end surface of said fixed member.

6. A lens barrel according to claim 3, wherein a projection on the outer surface of said flare diaphragm extends toward and is received by a recess formed in an inner surface of said second frame member.

7. A lens barrel according to claim 6, wherein said recess has an optical axis directional length which is longer than an optical axis directional length of said projection of said flare diaphragm.

8. A lens barrel according to claim 1, including means for moving said first and second frame members in a direction of the optical axis responsive to one of a zooming operation and a collapsing operation.

9. A lens barrel according to claim 6, wherein said projection of said flare diaphragm is disposed at a free end portion of an arm portion extending from a diaphragm surface of said flare diaphragm and extending in the direction of the optical axis.

10. A lens barrel according to claim 9, wherein a diameter of said flare diaphragm and said projection exceeds a diameter of an inner surface of said second frame member, said arm portion being elastically deformable so as to be received by said recess, so that said flare diaphragm is free to move over an axial distance along the optical axis relative to said second frame member which axial distance is substantially equal to the length of the recess measured in the axial direction.

11. A lens barrel according to claim 1, wherein said first frame member holds a lens group.

12. A lens barrel according to claim 11, wherein said lens group held by said first frame member is a rearmost lens group along the optical direction.

13. A lens barrel according to claim 1, wherein said fixed member forms a body of a camera.

14. A lens barrel according to claim 13, wherein said fixed member has an aperture which defines a photographing frame for a film positioned adjacent to said fixed member.

15. A lens barrel comprising:
a first frame member movable in a direction of an optical axis with respect to a fixed member;
a second frame member movable in a direction of the optical axis with respect to said fixed member and said first frame member;
a flare diaphragm engaging said second frame member, said flare diaphragm being selectively engaged by one of said fixed member and said first frame member as a result of the movement of said second frame member in a direction of the optical axis, so that said flare diaphragm is moved in a direction of the optical axis with respect to said second frame member.

16. A lens barrel according to claim 15, including means for limiting a linear movement of said flare diaphragm with respect to said second frame member.

17. A lens barrel according to claim 15, wherein an optical directional end surface of said flare diaphragm engages an optical directional end surface of one of said first frame member and said fixed member.

18. A lens barrel according to claim 15, including means for moving said first and second frame members in a direction of the optical axis responsive to one of a zooming operation and a collapsing operation.

19. A lens barrel according to claim 15, wherein said fixed member holds a lens group.

20. A lens barrel according to claim 15, wherein said fixed member forms a body of a camera.

21. A lens barrel comprising:
a first member;
a second frame member which selectively moves forward/rearward in a direction of an optical axis with respect to said first member; and
a flare diaphragm engaging and selectively movable by said second frame member, said flare diaphragm engaging said first member as a result of the movement of said second frame member in a direction of the optical axis with respect to said first member, so that said flare diaphragm is moved in a direction of the optical axis with respect to said second frame member.

22. A lens barrel according to claim 21, including means for moving said second frame member in a direction of the optical axis responsive to one of a zooming operation and a collapsing operation.

23. A lens barrel according to claim 21, wherein said first member holds a lens group.

24. A lens barrel according to claim 21, wherein said first member is a fixed member.

25. A lens barrel which can be collapsed into a camera body and having an adjustable focal distance, comprising:
a lens holding frame selectively movable forward/rearward in a direction of an optical axis in order to change the focal distance;
a float key selectively movable forward/rearward in a direction of an optical axis with respect to said lens holding frame in order to change the focal distance; and
a flare diaphragm slidably engaging said float key, and selectively movable forward/rearward in a direction of the optical axis due to movement of said float key, and stopped at a relative position due to a mutual frictional force between said float key and said flare diaphragm, wherein
a combined length of said float key and said flare diaphragm is shortest in a direction of the optical axis in a state where said lens barrel is in a collapsed state, the length becomes a greater predetermined length in the direction of the optical axis when said lens barrel has been moved from the collapsed state to a photographing state, and wherein the greater length is not changed in the photographing state due to changes in a focal distance of the lens barrel.

26. A lens barrel which can be collapsed into a camera body, said lens barrel having an adjustable focal distance, comprising:
a lens holding frame selectively movable forward/rearward in a direction of an optical axis in order to change the focal distance;
a float key selectively movable forward/rearward in a direction of the optical axis with respect to said lens holding frame in order to change the focal distance; and
a flare diaphragm slidably engaging said float key, and movable forward/rearward in a direction of the optical axis by said float key,
wherein said lens holding frame pushes said flare diaphragm in a direction of the optical axis to move said flare diaphragm to a predetermined position with respect to said float key during a process in which a state of said lens barrel is converted from a collapsed state to a state in which preparation for performing photography has been completed, said predetermined position being maintained even if a focal distance is changed.

27. A lens barrel which can be collapsed into a camera body and having an adjustable focal distance, comprising:
lens holding frames mutually movable forward/rearward in a direction of an optical axis; and
a flare diaphragm engageable by one of the said lens holding frames, and being moved to a predetermined position when engaged by one of the lens holding frames during conversion of said lens barrel from a collapsed state to a photographing state, and held by frictional force between the flare diaphragm and a lens barrel float key, said positional relationship being maintained even if the focal distance is changed.

28. A lens barrel comprising:
a lens holding frame movable forward/rearward in a direction of an optical axis in order to change a focal distance and which lens holding frame holds a lens;
a float key movable forward/rearward in a direction of the optical axis with respect to said lens holding frame in order to change the focal distance; and
a flare diaphragm engaging said float key, and movable along the optical axis with respect to said float key in such a manner that their relative positions along the optical axis are fixed by a frictional force between said flare diaphragm and said float key,
wherein a combined length of said float key and said flare diaphragm is shortest in the direction of the optical axis in a state where said lens barrel is in a collapsed state, and the combined length becomes a predetermined length in the direction of the optical axis which is greater than said combined length when said lens barrel has been converted from the collapsed state to a photographing state.

29. A lens barrel comprising:
a lens holding frame movable forward/rearward in a direction of an optical axis in order to change a focal distance and which frame holds a lens;
a float key movable forward/rearward in the direction of the optical axis with respect to said lens holding frame in order to change the focal distance; and
a flare diaphragm engaging said float key, and capable of moving in the direction of the optical axis with respect to said float key in such a manner that their relative positions are fixed by a frictional force provided at engaging portions of said flare diaphragm and said float key,
wherein said lens holding frame pushes said flare diaphragm in a direction of the optical axis so as to set said flare diaphragm to a predetermined position when a state of said lens barrel is converted from a collapsed state to a state in which preparation for performing photography has been completed.

30. A lens barrel comprising:
lens frame members which are mutually moved forward/rearward in a direction of an optical axis; and
a flare diaphragm held by one of said lens frame members in such a manner that a position of said flare diaphragm along the optical axis is maintained by a frictional force provided between engaging portions of said flare diaphragm and a float key movable in the direction of the optical axis.

31. A lens barrel comprising:
a first frame member, whose position along an optical axis is changed with respect to a fixed frame due to one of a zooming operation and a collapsing operation;
a float key, whose position along the optical axis is changed relative to said first frame member and a fixed member due to one of a zooming operation and a collapsing operation; and
a flare diaphragm engaging said float key and interposed between said first frame member and said fixed member, said flare diaphragm being moved in a direction of the optical axis with respect to said float key due to one of a relative movement of said first frame member and said float key in a direction of the optical axis and a relative movement of said float key and said fixed member in a direction of the optical axis.

32. A lens barrel comprising:
a float key, whose position along an optical axis is changed with respect to a fixed frame due to one of a zooming operation and a collapsing operation;
a second frame member, whose position along the optical axis is changed with respect to said float key due to one of the zooming operation and the collapsing operation;
wherein a direction of movement of the second frame member with respect to said float key is the same as a direction of movement with respect to the fixed frame and wherein an amount of movement is different from each other in a specific region of one of a zooming operation and a collapsing operation, and a direction of movement of the second frame member with respect to the float key opposes a direction of the fixed frame in a region outside of said specific region,
a fixed member integrated to said fixed frame; and
a flare diaphragm engaging said float key,
wherein movement of said second frame member in a first direction of the optical axis forcibly moves said flare diaphragm in the same direction in said specific region during one of the zooming operation and the collapsing operation, the position of said flare diaphragm with respect to said float key being maintained by a frictional force exerted between engaging portions of said flare diaphragm and said float key in said region outside of said specific region, and said flare diaphragm is moved in a direction opposite said first direction responsive to engagement of said flare diaphragm with said fixed member taking place due to the relative movement of said float key with respect to said fixed member in an opposite operation moving from said specific region to a region outside said specific region.

33. A lens barrel according to claim 32, wherein said flare diaphragm is composed of an annular-shaped member engaging said float key by a plurality of resilient, elastic arm-like members each having a fastening claw extending toward said float key, said annular-shaped member extending from and integral with said arm-like members.

34. A lens barrel according to claim 32, wherein said flare diaphragm and said second frame member and an opening in said flare diaphragm are moved so that said flare diaphragm does not come into contact with a lens held by said second frame member.

35. A lens barrel comprising:
a float key, movable along an optical axis with respect to a fixed frame due to one of a zooming operation and a collapsing operation;
a second frame member, movable along the optical axis with respect to said float key due to one of a zooming operation and the collapsing operation;
wherein a first direction of movement of said second frame member with respect to said float key is the same as a direction of the fixed frame and the amount of movement is different from each other in a specific region of the zooming operation and the collapsing operation, and a second direction of movement with respect to said float key opposes the direction of the fixed frame in a nonspecific region outside of said specific region,
a fixed member integrated to said fixed frame; and
a flare diaphragm engaging said first frame member,
wherein the movement of said second frame member in a first direction of the optical axis forcibly moves said flare diaphragm in the same direction in said specific region of the zooming operation and the collapsing operation, the position of said flare diaphragm with respect to said float key being maintained by a frictional force exerted between engaging portions of the flare diaphragm and the float key in a first non-specific region outside of said specific region, and said flare diaphragm is moved in a direction opposing the first direction in which said flare diaphragm is moved from said first specific region to said first non-specific region due to the combined action of said fixed member with respect to said float key in an operation moving from said first specific region to said first non-specific region.

36. A lens barrel according to claim 35, wherein said flare diaphragm is composed of an annular member provided with a plurality of resilient, elastic arm-like members each having a fastening claw, said annular member being integral with and extending from said arm-like members, said arm-like members frictionally engaging a surface of said float key surrounding said annular member.

37. A lens barrel according to claim 35, wherein said flare diaphragm, said second frame member and an opening in said flare diaphragm are moved so that said flare diaphragm does not come in contact with a lens held by said second frame member.

38. A lens barrel comprising:
a camera body;
a fixed frame secured to said camera body;
a cam frame fitted to an inner surface of said fixed frame;
a linear-movement guide frame fitted to an inner surface of said cam frame;
a lens frame member guided by said linear-movement guide frame, cam-connected to said cam frame, and fitted to an inner surface of said cam frame;
a flare diaphragm fitted to said linear-movement guide frame; and
drive means for driving said cam frame, wherein
said cam frame is moved in a first direction along an optical axis by an operation performed by said drive means moving in a first direction, said lens frame member is moved in a second direction along the optical axis with respect to said linear-movement guide frame due to said movement of said cam frame, said flare diaphragm is moved in the direction along the optical axis with respect to said linear-movement guide frame due to said movement of said lens frame member, said lens frame member is moved in the second direction along the optical axis with respect to said linear-movement guide frame whereby said flare diaphragm is further moved in said first direction so that said flare diaphragm and said lens frame member are displaced from each other and said flare diaphragm is coupled to said linear-movement guide frame due to a frictional force provided between said flare diaphragm and said linear-movement guide frame, and driving action performed in a second direction opposing said first direction causes said cam frame to be moved in the second direction along the optical axis, said movement causes said linear-movement guide frame to be relatively moved in the first direction along the optical axis with respect to said camera body, and said movement causes said flare diaphragm to be relatively moved in the first direction along the optical axis with respect to said linear-movement guide frame.

39. A lens barrel according to claim 38, wherein said flare diaphragm is composed of an annular member having a plurality of resilient, elastic arm-like members each having a fastening claw, said annular member being formed integral with and extending from said arm-like member, said arm-like members frictionally engaging said first frame member.

40. A lens barrel according to claim 38, wherein said flare diaphragm, said lens frame member and an opening in said flare diaphragm are moved so that said flare diaphragm does not come into contact with a lens held by said lens frame member.

41. A lens barrel according to claim 2 wherein said flare diaphragm has an annular-shaped surface engaging a surface of a similar shape provided on said second frame member, said frictional engagement being between said engaging annular surfaces.

42. A lens barrel according to claim 1 wherein the frictional engagement is enhanced by providing said flare diaphragm annular surface with a plurality of resilient, elastic finger-like arms each having a surface engaging the cooperating engaging surface of said second frame member;

said arms being biased outwardly, the elasticity of said arms enhancing the frictional engagement between said flare diaphragm and said second frame member.

43. A lens barrel according to claim 41 wherein the second frame member is provided with a plurality of openings;

a free end of each finger-like arm being provided with a claw-like projection, each claw-like projection extending into one of said openings, said claw-like projections and said cooperating openings limiting the extent of a linear movement of said flare diaphragm relative to said second frame member along the optical axis.

44. A lens barrel according to claim 33 wherein said flare diaphragm has an annular-shaped surface engaging a surface of a similar shape provided on said float key, said frictional engagement being between said engaging annular surfaces.

45. A lens barrel according to claim 44 wherein the float key is provided with a plurality of openings;

a free end of each finger-like arm being provided with a claw-like projection, each claw-like projection extending into one of said openings, said claw-like projections and said cooperating openings limiting the extent of a linear movement of said flare diaphragm relative to said float key along the optical axis.

46. A lens barrel according to claim 36 wherein said flare diaphragm has an annular-shaped surface engaging a surface of a similar shape provided on said float key, said frictional engagement being between said engaging annular surfaces.

47. A lens barrel according to claim 46 wherein the float key is provided with a plurality of openings;

a free end of each finger-like arm being provided with a claw-like projection, each claw-like projection extending into one of said openings, said claw-like projections and said cooperating openings limiting the extent of a linear movement of said flare diaphragm relative to said float key along the optical axis.

48. A lens barrel according to claim 39 wherein said flare diaphragm has an annular-shaped surface engaging a surface of a similar shape provided on said linear movement guide frame, said frictional engagement being between said engaging annular surfaces.

49. A lens barrel according to claim 48 wherein the linear movement guide frame is provided with a plurality of openings;

a free end of each finger-like arm being provided with a claw-like projection, each claw-like projection extending into one of said openings, said claw-like projections and said cooperating openings limiting the extent of a linear movement of said flare diaphragm relative to said linear movement guide frame along the optical axis.

50. A lens barrel comprising:

an annular frame member for holding a lens, said frame member being movable in a direction of an optical axis with respect to a fixed member;

an annular-shaped float key movable in a direction of the optical axis with respect to said fixed member and said first annular-shaped frame member;

an annular-shaped flare diaphragm positioned adjacent said annular-shaped float key and having a portion thereof interposed between said annular-shaped frame member and said fixed member;

said flare diaphragm having an annular-shaped end portion with an opening having a central axis which is substantially coincident with said optical axis and a plurality of resilient, elastic finger-like arms extending substantially parallel to the optical direction from said end portion;

an outer surface of each arm-like member slidably frictionally engaging an interior surface of said float key;

said flare diaphragm being movable together with said float key when moved between an inner and outer limit, said flare diaphragm being movable relative to said float key due to engagement by said first frame member when moved in a first direction beyond said outer limit and being movable relative to said float key due to engagement with said fixed member when moved in a second direction beyond said inner limit.

51. A lens barrel according to claim 50 wherein each of said resilient, elastic arms are biased outwardly in a direction toward said float key to enhance the frictional engagement therebetween.

52. A lens barrel according to claim 50 wherein said float key is provided with a plurality of openings;

a free end of each arm being provided with a claw-like projection, each claw-like projection extending into an associated one of said openings;

said claw-like projections and cooperating openings limiting the extent of relative movement between said flare diaphragm and said float key.

* * * * *

UNITED STATES PATENT AND TRADEMARK OFFICE
CERTIFICATE OF CORRECTION

PATENT NO. : 5,392,160
DATED : February 21, 1995
INVENTOR(S) : Satoh et al

It is certified that error appears in the above-identified patent and that said Letters Patent is hereby corrected as shown below:

In the Abstract: Line 8, delete "to".

Col. 2, line 45, delete "them".

Col. 2, line 48, delete "them".

Col. 3, line 16, delete "first frame" and insert --fixed--.

Col. 3, line 33, delete "the" (first occurrence).

Col. 4, line 39, delete "pass" and insert --permit--.

Col. 5, line 67, delete "cam associate" and insert --an associated--.

UNITED STATES PATENT AND TRADEMARK OFFICE
CERTIFICATE OF CORRECTION

PATENT NO. : 5,392,160
DATED : February 21, 1995
INVENTOR(S) : Satoh et al

It is certified that error appears in the above-identified patent and that said Letters Patent is hereby corrected as shown below:

Col. 6, line 32, after "cylinder" insert --40--.

Col. 6, line 61, delete "10" and insert --30--.

Col. 6, line 62, delete "10" and insert --30--.

Col. 7, line 1, after "camera" insert --body--.

Signed and Sealed this

Thirty-first Day of August, 1999

Attest:

Q. TODD DICKINSON

*Attesting Officer*     *Acting Commissioner of Patents and Trademarks*